United States Patent
Samuel et al.

(10) Patent No.: US 11,761,320 B2
(45) Date of Patent: Sep. 19, 2023

(54) METHOD AND SYSTEM TO DRILL A WELLBORE AND IDENTIFY DRILL BIT FAILURE BY DECONVOLUTING SENSOR DATA

(71) Applicant: LANDMARK GRAPHICS CORPORATION, Houston, TX (US)

(72) Inventors: Robello Samuel, Cypress, TX (US); Vikrant Lakhanpal, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 618 days.

(21) Appl. No.: 16/489,379

(22) PCT Filed: May 15, 2017

(86) PCT No.: PCT/US2017/032763
§ 371 (c)(1),
(2) Date: Aug. 28, 2019

(87) PCT Pub. No.: WO2019/216867
PCT Pub. Date: Nov. 14, 2019

(65) Prior Publication Data
US 2021/0363871 A1    Nov. 25, 2021

(51) Int. Cl.
*E21B 44/00*    (2006.01)
*E21B 12/02*    (2006.01)
(Continued)

(52) U.S. Cl.
CPC .............. *E21B 44/00* (2013.01); *E21B 12/02* (2013.01); *E21B 44/005* (2013.01); *E21B 47/00* (2013.01); *G01L 5/00* (2013.01); *G06F 18/00* (2023.01)

(58) Field of Classification Search
USPC .............................................. 702/9
See application file for complete search history.

(56) References Cited

U.S. PATENT DOCUMENTS 4,631,514 A    12/1986  Fujiwara
5,076,399 A    12/1991  Horbruegger
(Continued)

FOREIGN PATENT DOCUMENTS

WO    2005086691 A2    9/2005

OTHER PUBLICATIONS

Lakhanpal, Vikrant, "Deconvolution of Vibrational Data to Reduce the Ambiguity in Downhold Tool Failure", SPE-181491-MS, SPE Annual Technical Conference and Exhibition, Sep. 26-28, Dubai, UAE, 2016, pp. 1-9.

*Primary Examiner* — Paul D Lee
(74) *Attorney, Agent, or Firm* — K&L Gates LLP

(57) ABSTRACT

A method and system to drill a wellbore and identify drill bit failure by deconvoluting sensor data. The method comprises drilling the wellbore using a drill bit; and measuring data indicative of a parameter associated with the drill bit using a sensor located in the wellbore. The method also comprises decomposing the data to generate an intrinsic mode function of the drill bit data; and analyzing the intrinsic mode function to identify a drill bit failure. The system for drilling the wellbore comprises a drill bit; a sensor; and a processor. The sensor is located in the wellbore and operable to measure data indicative of a parameter associated with the drill bit. The processor is in communication with the sensor and operable to decompose the data to generate an intrinsic mode function of the drill bit data; and analyze the intrinsic mode function to identify a drill bit failure.

16 Claims, 12 Drawing Sheets

(51) Int. Cl.
  *E21B 47/00* (2012.01)
  *G01L 5/00* (2006.01)
  *G06F 18/00* (2023.01)

(56) References Cited

U.S. PATENT DOCUMENTS

| | | | |
|---|---|---|---|
| 5,151,882 A * | 9/1992 | Kingman | G01V 1/42 |
| | | | 702/9 |
| 6,769,497 B2 | 8/2004 | Dubinsky | |
| 6,825,633 B2 | 11/2004 | Hamann | |
| 8,515,619 B2 | 8/2013 | Yamakado | |
| 2002/0148644 A1 | 10/2002 | Schultz | |
| 2004/0225382 A1 | 11/2004 | Brown | |
| 2009/0006058 A1 | 1/2009 | King | |
| 2011/0153217 A1* | 6/2011 | Rodney | E21B 47/00 |
| | | | 702/9 |
| 2013/0192894 A1 | 8/2013 | Zediker | |
| 2014/0288766 A1 | 9/2014 | Chakravarty | |
| 2017/0004235 A1* | 1/2017 | Samuel | E21B 12/02 |
| 2017/0268324 A1* | 9/2017 | Moore | E21B 47/00 |

\* cited by examiner

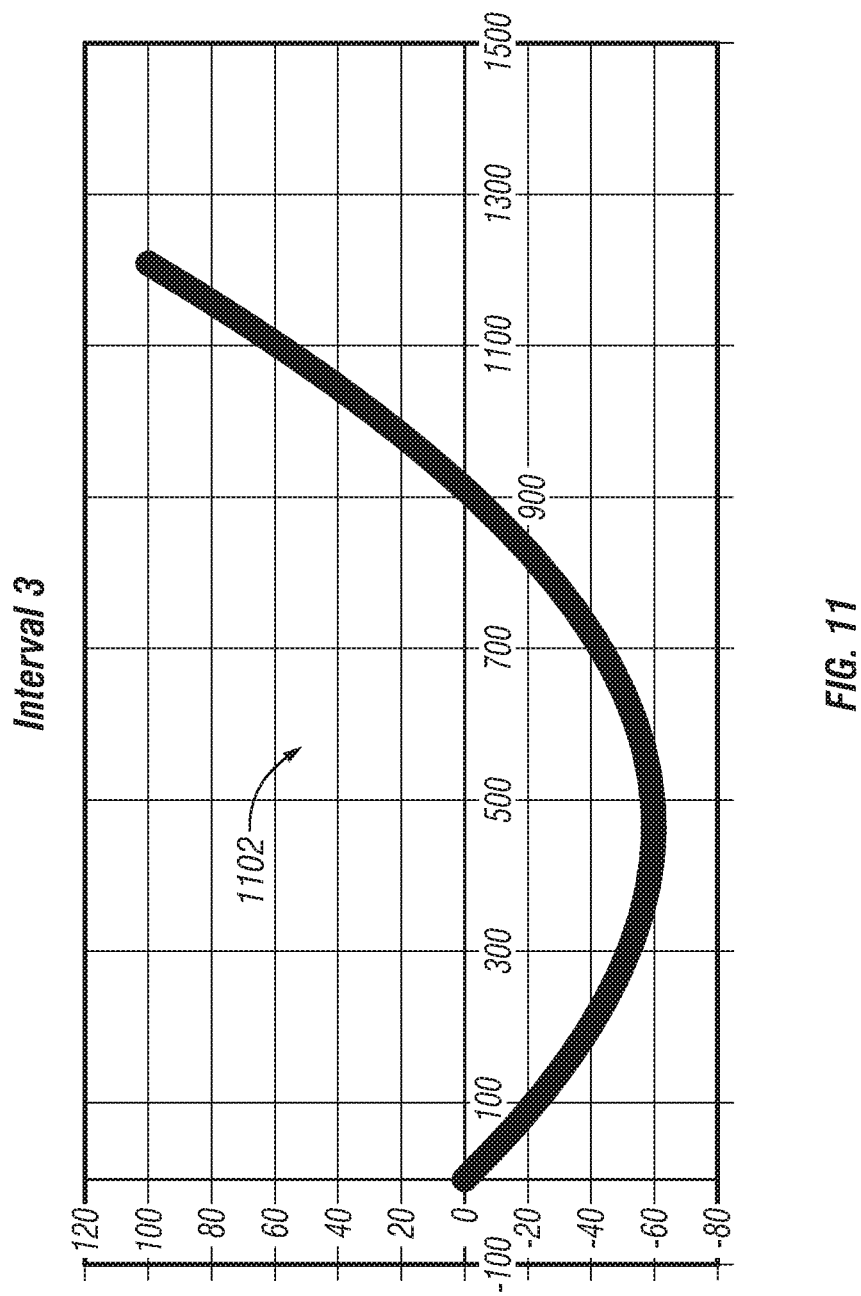

METHOD AND SYSTEM TO DRILL A WELLBORE AND IDENTIFY DRILL BIT FAILURE BY DECONVOLUTING SENSOR DATA

BACKGROUND

This section is intended to provide relevant background information to facilitate a better understanding of the various aspects of the described embodiments. Accordingly, it should be understood that these statements are to be read in this light and not as admissions of prior art.

Various types of downhole drilling tools including, but not limited to, rotary drill bits, reamers, core bits, and other downhole tools have been used to form wellbores in associated downhole formations. Examples of such rotary drill bits include, but are not limited to, fixed cutter drill bits, drag bits, polycrystalline diamond compact (PDC) drill bits, and matrix drill bits associated with forming oil and gas wells extending through one or more downhole formations. Fixed cutter drill bits such as a PDC bit may include multiple blades that each include multiple cutting elements.

When a drill bit becomes worn, the drill bit needs to be replaced due to the reduced rate of drilling penetration for the worn bit. At a certain point, the cost of replacing the worn drilling bit with a new bit becomes equal to the cost of the drilling inefficiency, or in other words, the cost of the new bit plus the cost of rig time in moving the drill string in and out of the well bore is less than the cost of operating the worn bit. Unfortunately, once a drill bit is positioned in a wellbore, gathering reliable information regarding the operating condition, performance and remaining useful life of the drill bit is difficult.

In the worst case, the drilling rig operator may unknowingly run the drill bit until failure. Bit failure may also result from an improper application of the bit, such as by excessive weight on the drill bit from the drilling string, excessive rotational speed, and drilling with the wrong type of bit for the formation being drilled, or even from a defect in the drill bit itself. Bit failures typically occur in one of two modes: (1) breakage of the cutting elements, or (2) bearing failure. The first mode of failure is more common, and the second mode is more serious.

In the first mode, pieces of the cutting elements, which can be steel teeth or tungsten carbide inserts, are broken from the roller cutters. This breakage does not normally stop the drilling action but it does significantly reduce the rate of drilling penetration, and the broken pieces are mostly carried away from the well bore bottom by the circulating drilling fluid thereby leaving the well bore bottom clean for a replacement bit.

The second mode of failure can occur if a rotary bit is continued to be used with a worn bearing assembly as the assembly will no longer be able to hold the roller cutter on the bearing journal, and consequently, the roller cutter will fall from the bit when the drill string is pulled from the well bore. A lost roller cutter can be retrieved from the well bore bottom only by a time-consuming and expensive "fishing" operation in which a special retrieval tool is tripped in and out of the well bore to retrieve the broken cutter and any pieces.

Numerous bearing failure indicator systems have been proposed for inclusion in drill bits so as to give the drilling rig operator a signal predicting bearing failure. One such system involves measurement and interpretation of certain drilling parameters at the drill rig, such as drill string torque, weight on bit, and rate of penetration, to predict drill bit bearing failure. In practice this system has proved to be unreliable, likely due to the large number of variables other than bit performance, such as the type of subterranean formation and the pressure and flow rate of the drilling fluid, which affect the drilling parameters that are measured at the drill rig.

Another system, involves a marker fluid, such as a radioactive material in the bearing lubricant, which is released into the drilling fluid upon bearing failure. The released marker fluid is detected at the drill rig when the drilling fluid is circulated back up to the surface. While this method does detect the loss of lubricant in a sealed bearing drill bit that precedes, or at least accompanies, the failure of the bearings of the roller bit, and thus is a reliable indication of bit failure, the system has several shortcomings. In addition to the difficulties present in handling radioactive materials, a major shortcoming is that a significant amount of marker fluid must be released into the relatively large volume of drilling fluid or else become so diluted as to be undetectable.

A Fourier transform has also been applied to sensor data of parameters associated with the drill bit to identify anomalies. Even after the Fourier transform analysis, it is difficult to identify patterns to predict the bit life due to various interrelated formation parameters.

It would be advantageous to provide a system and method to reliably detect the wear of a drill bit prior to catastrophic failure of the drill bit.

DESCRIPTION OF THE DRAWINGS

Embodiments of the invention are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

FIGS. 9-11 show graph views of the energy curves for drill bit data measured along three different depth intervals of the drill bit wear curve of FIG. 8.

DETAILED DESCRIPTION

Figure 1:
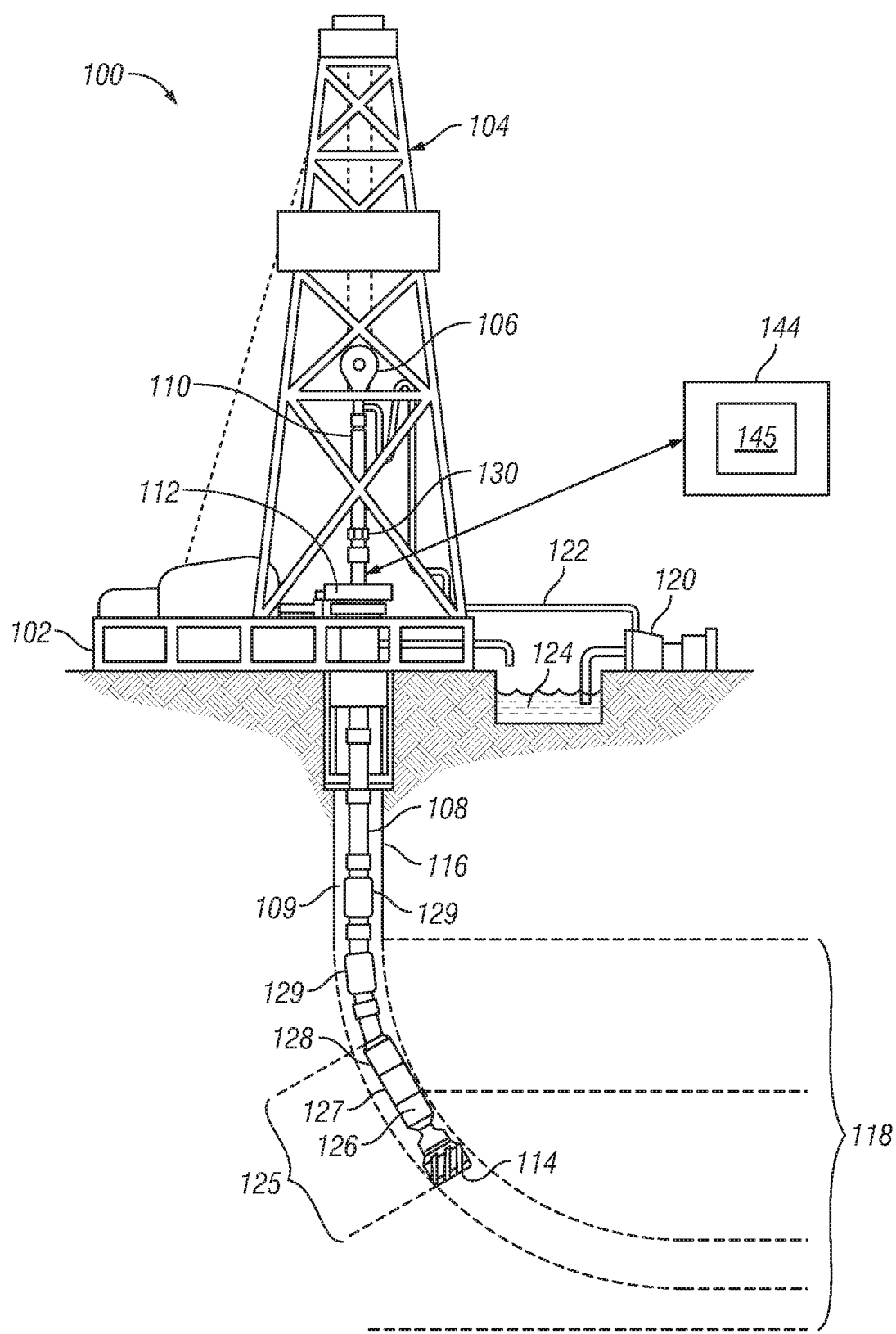
FIG. 1 shows a schematic view of a drilling system, according to one or more embodiments.

FIG. 1 shows a schematic view of a drilling operation employing a system 100 for drilling a wellbore 116, according to one or more embodiments. As shown, a drilling platform 102 supports a derrick 104 having a traveling block 106 for raising and lowering a drill string 108. A drill string kelly 110 supports the rest of the drill string 108 as it is lowered through a rotary table 112. The rotary table 112 rotates the drill string 108, thereby turning a drill bit 114. As the drill bit 114 rotates, it creates a wellbore 116 that passes through various subterranean earth formations 118. A pump 120 circulates drilling fluid through a feed pipe 122 to the kelly 110, downhole through the interior of the drill string 108, through orifices in the drill bit 114, back to the surface via an annulus 109 around the drill string 108, and into a retention pit 124. The drilling fluid transports cuttings from the wellbore 116 into the pit 124 and aids in maintaining the integrity of the wellbore 116.

A bottomhole assembly 125 is connected along the drill string 108 and includes a drill collar 126, one or more drill bit sensors 127, one or more downhole sensors 128, and the drill bit 114. The drill collar 126 is a thick-walled steel pipe section that provides weight and rigidity for the drilling process. The drill bit sensors 127 (which may be built into one of the drill collars) may collect measurements associated with the drill bit including any one or a combination of acceleration of the drill bit, jerk of the drill bit, weight-on-bit, torque-on-bit, rate of penetration, drill bit revolutions as a function of time (e.g., revolutions per minute), and drill bit temperature. The drill bit sensors 127 may include any one or combination of tri-axial accelerometers, a strain gauge, a load cell, a temperature sensor, and a pressure sensor.

The downhole sensors 128 may also collect measurements relating to various wellbore and formation properties as well as the position of the bit 114 and various other drilling conditions as the bit 114 extends the wellbore 116 through the formations 118. The sensors 128 may include any one or a combination of a device for measuring formation resistivity, a gamma ray logging tool for measuring formation gamma ray intensity, a seismic measurement device for measuring seismic formation data, devices for measuring the inclination and azimuth of the tool string 108, pressure sensors for measuring drilling fluid pressure, temperature sensors for measuring wellbore temperature, etc. The drilling system 100 may also include sensors 129 distributed along the drill string 108 to measure various parameters for identifying or predicting drill bit failure as further described herein.

As used herein, drill bit failure refers to a situation where the drilling efficiency of the drill bit warrants replacement of the drill bit. As used herein, drill bit wear refers to a parameter indicative of the change in drill bit teeth height relative to the maximum drill bit teeth height. Drill bit life refers to the penetration distance that the drill bit may travel through a subterranean formation before drill bit failure occurs.

The bottom hole assembly 125 may include a telemetry device that receives data provided by the various sensors 127, 128 of the bottomhole assembly 125, and transmits the data to a surface controller 144. Data may also be provided by the surface controller 144, received by the telemetry device, and transmitted to the sensors 127, 128 of the bottomhole assembly 125. The surface controller 144 collects measurements from the bottomhole assembly 125, and includes a computer system 145 for processing and storing the measurements gathered by the sensors 128. Among other things, the computer system 145 may include a processor and a non-transitory machine-readable medium (e.g., ROM, EPROM, EEPROM, flash memory, RAM, a hard drive, a solid state disk, an optical disk, or a combination thereof) capable of executing instructions to perform such tasks. In addition to collecting and processing measurements, the computer system 145 may be capable of controlling the bottomhole assembly 125 and the sensors 127, 128. The surface controller 144 may further include a user interface (not shown) which displays the measurements, for example, a monitor or printer.

The increasing complexities of wellbore geometry, including depth and formation properties, result in an increased potential for damage to downhole components and loss of drilling time as a result of drill bit wear. One or more drilling characteristics may affect drill bit wear and/or drill bit failure while drilling in the formation. These drilling characteristics may include properties of the formation itself (e.g., porosity, plasticity, density, rock strength, rock type and composition (e.g. shale, sandstone, limestone, etc.)), changes in the formation being drilled, the presence of types of fluids in the formation, the presence of brines in the formation, the presence of hydrocarbons (e.g., oil or natural gas) in the formation, changes in concentration of gases as the formation is being drilled, temperatures of components of the drilling tool, vibration of the drilling tool and drill string, torsion, cutting element wear, depth of cut control, cutting sizes, etc.

Vibrations encountered by the bottomhole assembly 125 may result from drilling conditions including but not limited to imbalances due to different downhole components, drill bit wear, and interaction of the drill bit with the formation. The drill bit sensor 127 may be sensitive to the vibrations and thus affect the data measured, creating interference and uncertainties in the data to identify behaviors, patterns, or signatures that indicate drill bit failure and/or drill bit wear. Formation properties may also dampen, amplify, or interfere with the data measured by the drill bit sensors 127.

A bit wear factor of the drill bit may be calculated from the geometric correlation between height loss and the cutter volume loss, as further discussed below, to identify drill bit failure. The volume loss of cutters may be assumed to be proportional to weight on bit, cutter sliding distance, rock strength, and normalized rock quartz content. An analytical model indicative of drill bit failure may be refined with a comparison of formation data (including gamma ray data, resistivity data, or seismic data) and drill bit data (including of acceleration of the drill bit, jerk of the drill bit, weight-on-bit, torque-on-bit, rate of penetration, drill bit revolutions as a function of time, or drill bit temperature). Jerk physics may also be used to quantify the intensity of vibration by eliminating the signal due to vibration using a deconvolution process. Formation data and/or drill bit data may also be used to train a model to quantify the influence of the formation strength interaction with the analytical model indicative of the drill bit failure. As further discussed below, the analytical model integrates a new bit wear model and data analytics using real-time formation data to reliably identify drill bit failure while suppressing the uncertainties attributable to formation properties and other intervening variables.

Figure 2:
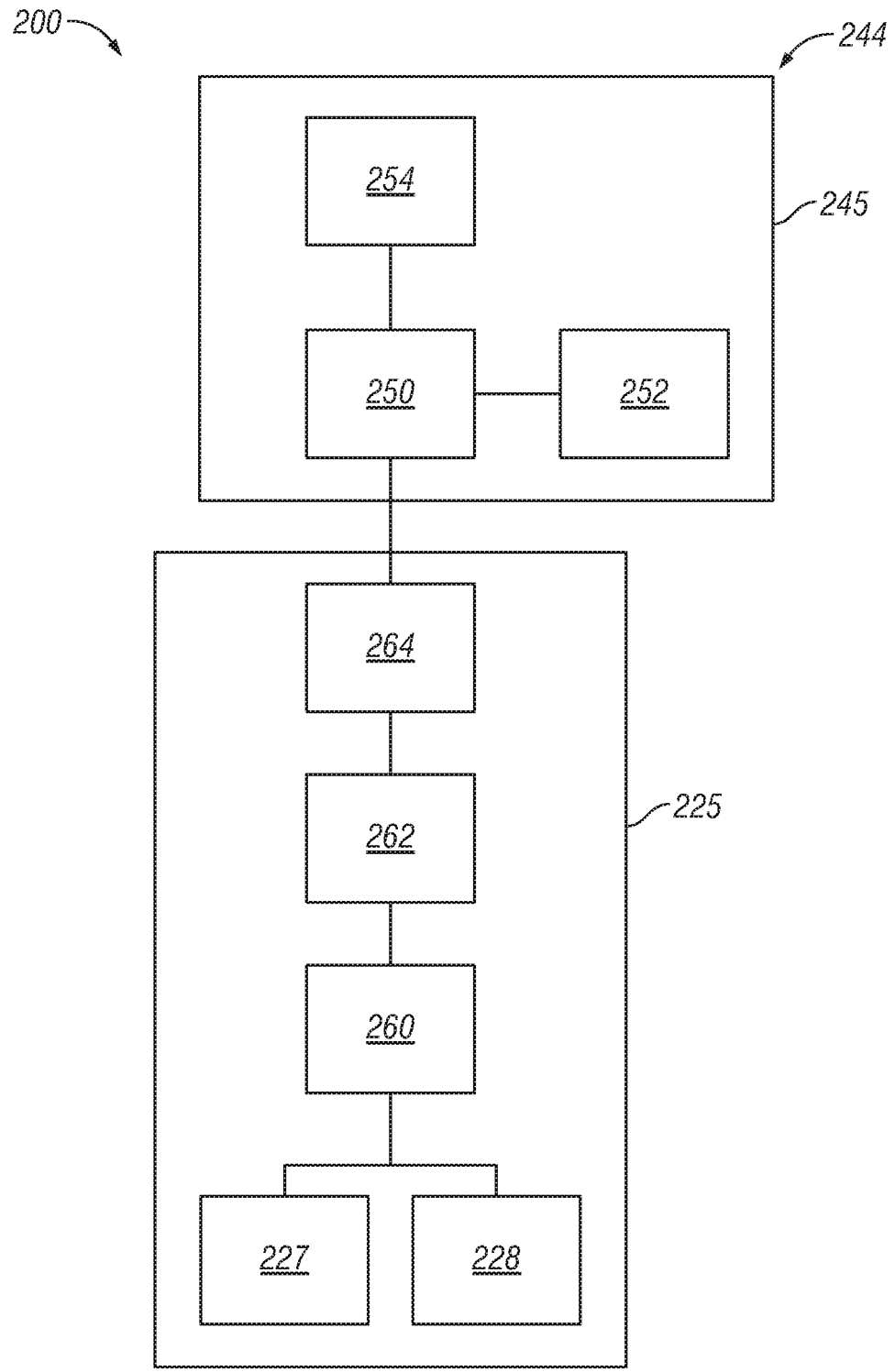
FIG. 2 shows a block diagram view of a drilling system, according to one or more embodiments.

FIG. 2 shows a block diagram view of a drilling system 200 that operates to decompose drill bit data according to one or more embodiments. The drilling system 200 can be used to measure drill bit data and formation data, decompose the drill bit data into intrinsic mode functions, and monitor the behavior of intrinsic mode data to identify or predict drill bit wear and/or drill bit failure. As shown, the bottomhole assembly 225 is in communication with a surface controller 244, which can collect and process the data measured using the bottomhole assembly 225. The bottomhole assembly 225 includes one or more drill bit sensors 227, one or more downhole sensors 228, a data acquisition system 260, an analysis module 262, and a telemetry device 264. Any one or a combination of the drill bit sensors 227, downhole sensors 228, data acquisition system 260, analysis module 262, or telemetry device 264 may be housed in the bottomhole assembly 225.

Data from the one or more drill bit sensors 227 can be acquired using a data acquisition system 260, which feeds the data from the sensors 227, after amplification and filtering, into an analysis module 262, which may include a processor and memory for processing the sensor data. The data acquisition system 260 may include any one or a combination of filters, amplifiers, or an analog-to-digital converter. The analysis module 262, in turn, may be used to deconvolve the drill bit data, decompose the deconvolved drill bit data into intrinsic mode functions, and calculate the total energy of the intrinsic mode functions to identify a drill bit failure as further described herein. The data acquisition system 260 may also acquire measurements from the downhole sensors 228 for processing with the analysis module 262. The data acquired and/or results of the analysis module 262 can be transmitted using the telemetry device 264 to the surface controller 244 for further processing. The telemetry device 264 can also be used to receive various parameters or instructions from the surface controller 244. For example, the surface controller 244 may provide a drill bit model based on formation parameters used to analyze the drill bit data as further discussed herein.

It should also be noted that any of the components shown, as part of the bottomhole assembly 225 may be located at the surface controller 244. Similarly, components shown as part of the surface controller 244 may be located downhole and/or included with the bottomhole assembly 225, which may serve to reduce the use of high data rate telemetry techniques on a particular project. Thus, it should be appreciated that many embodiments of the drilling system 200 may be realized.

The surface controller 244 includes a computer system 245, which may include a processor 254, an information storage device 252, and a user interface 250. The processor 254 can be used to further process the sensor data, e.g., to train drilling operation models including but not limited to neural networks, fuzzy rule-based systems, support vector machines, etc. The sensor data can be stored in the information storage device 252 for further processing at the earth's surface. The storage device 252 may include a non-transitory storage medium to electronically store sensor data. The control of the bottomhole assembly 225 and analysis of the sensor data may also be performed with the use of a computer program stored on the storage device 252. The non-transitory storage medium may include ROM, EPROM, EEPROM, flash memory, RAM, a hard drive, a solid state disk, an optical disk, or a combination thereof. Thus, the drilling system 200 may comprise a computer system 245 to analyze the sensor data and/or display a variety of information about the drill bit on the user interface 250, which may include an input device (e.g., a keyboard) and an output device (e.g., a monitor or tablet). The processor 254 can be at least partially housed by the bottomhole assembly 225 as well.

As noted previously, the telemetry device 264 can be used to send various types of information to the surface controller 244. The telemetry device 264 can be used to transmit an alert message to the surface controller 244 indicating a drill bit failure, with a display of the alert message content based on the analysis of the sensor data. In this way, the sensor data might be used to initiate an alarm, which may be used to stop or adjust drilling operations.

As previously discussed, the drill bit sensors 227 measure data indicative of a parameter associated with the drill bit including any one or a combination of acceleration of the drill bit, jerk of the drill bit, weight-on-bit, torque-on-bit, rate of penetration, drill bit revolutions as a function of time (e.g., revolutions per minute), and drill bit temperature. The drill bit sensors 227 may be installed on or integrated with the bottomhole assembly 225 and also include any one or combination of tri-axial accelerometers, a strain gauge, a load cell, a temperature sensor, and a pressure sensor. Certain abnormal behavioral patterns of a drill bit can be identified using drill bit sensor data, such as jerk. Although this discussion provides examples for analyzing jerk data, it should be appreciated that the methods and systems described herein may analyze any suitable drill bit data that can be used to identify drill bit failure and/or drill bit wear.

Figure 3A:
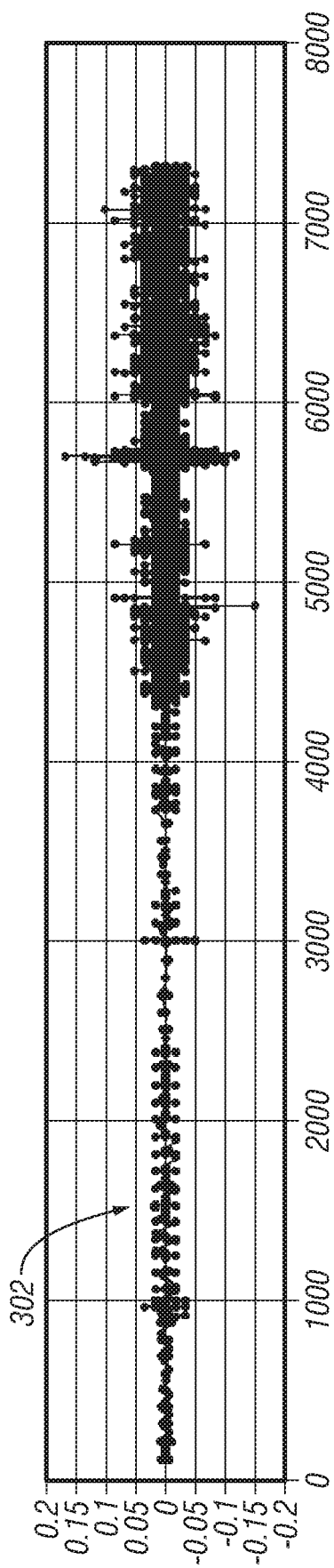
FIG. 3A shows a graph view of jerk measurements acquired using the drilling system of FIG. 2, according to one or more embodiments.

FIG. 3A shows a graph view of jerk measurements 302 acquired at a certain depth in a wellbore, according to one or more embodiments. As shown, the jerk measurements 302 are the jerk measured in the x-direction of a Cartesian coordinate system as a function of time for a certain depth. Jerk is the infinitesimal rate of change of acceleration; that is, the derivative of acceleration with respect to time, and as such, the second derivative of velocity or the third derivative of position. As a non-limiting example, jerk can be calculated based on values of acceleration measured by one or more accelerometers, such as accelerometers included with the drill bit sensors 227.

Values of jerk can be computed along the coordinates of a Cartesian axis system (x, y, and z axes) based on corresponding timed readings obtained from the drill bit sensors 227 Taking a numerical derivative, the jerk can be calculated as $$J = a' = \lim_{\Delta t \to 0} \frac{a(t + \Delta t) - a(t)}{\Delta t} \tag{1}$$

where $a(\tau)$ is the acceleration at time $\tau$.

The inverse of jerk ($J^{-1}$) may also provide valuable insight into drill bit failure. Mathematically, "J inverse", the reciprocal of jerk, can be expressed as follows:

$$\vec{J}(t)^{-1} = \frac{dt}{d\vec{a}(t)} \tag{2}$$

While monitoring jerk, there may be a sudden increase (such as a shock, which is a derivative of jerk) in the amplitude of the signal/data being monitored, which may not provide the operator sufficient time to react to the problem. To overcome this issue, instantaneous jerk intensity may be calculated and analyzed. Jerk intensity can be calculated as $$JI = \frac{\int_0^t J^2(\tau) d\tau}{\int_0^t d\tau} \tag{3}$$

where $J(\tau)$ is the instantaneous jerk at any time $\tau$.

Figure 3B:
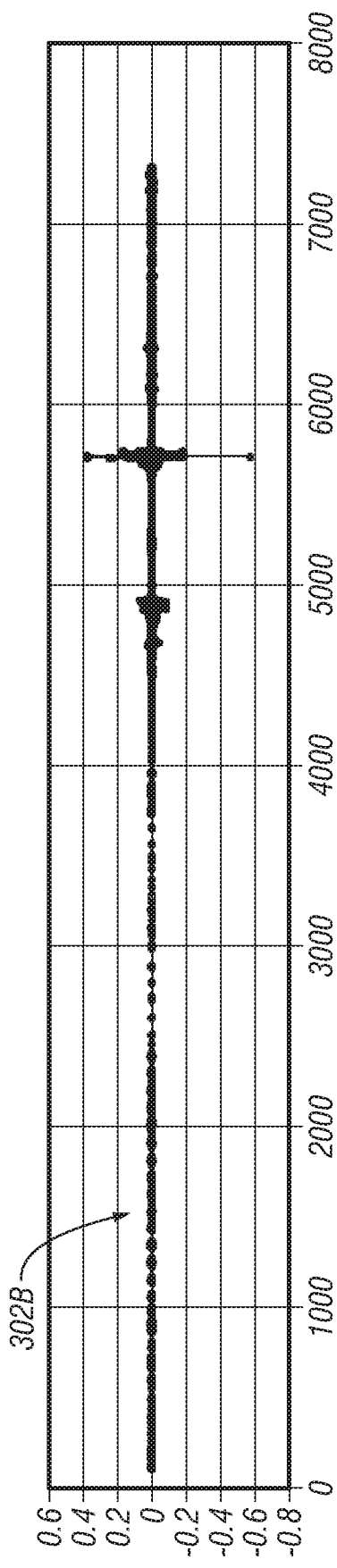
FIG. 3B shows a graph view of the jerk measurements of FIG. 3A after deconvolution, according to one or more embodiments.

Analysis of the drill bit data facilitates real-time identification of a drill bit failure and/or drill bit wear. As shown in FIG. 3A, vibrational noise is also present in the jerk measurements 302. Any additional noise in the recorded data can broaden the base of the data within a frequency spectrum, and the data can exhibit nonlinear offsets with an unclear cause. To differentiate the expected drill bit parameter values from drilling anomalies and focus the analysis efforts on identifying drill bit failure, the drill bit sensor data can be filtered using blind source deconvolution. The goal is to recover the actual signal from the observed vibrational noise, given no information about the noise source. The drill bit sensor data may be deconvolved using two deconvolution techniques: Miniumum Entroy Deconvolution (MED) and Teager-Kaiser energy operator (TKEO). FIG. 3B shows a graph view of the jerk measurements 302B after deconvolution is applied to the jerk data using MED-TKEO deconvolution, according to one or more embodiments. It should be noted that the analysis module 262 may be operable to perform the deconvolution of the drill bit data for identification of the drill bit failure as further described herein. For jerk data, the deconvolution may be applied to the acceleration data before jerk is calculated.

Minimum Entropy Deconvolution (MED) suppresses the bands over which the ratio of coherent signal-to-random noise is lowest and thereby emphasizes those bands in which coherent signals dominate. MED applies a linear operator which, when convolved with the input or sample signals, converts these signals to a "simple" appearance. Here, "simple" means that each desired signal consists of a few large spikes of unknown sign or location separated by nearly zero terms. MED maximizes the order or equivalently minimizes the entropy of the signals; hence, the name minimum entropy deconvolution.

Transients and background signals can be easily separated through the TKEO, which is a nonlinear high-pass filter. TKEO reduces the variation of low-frequency background signals while boosting transient components of a signal in the high-frequency region. The first-order discrete time model of the TKEO is expressed as $$\varphi(x[n]) = x^2[n] - x[n-1]x[n+1] \quad (4)$$

Thus, $\varphi(x[n])$ represents the $n^{th}$ sampled signal that passed the TKEO, also known as the Teager energy of the signal. The TKEO algorithm detects a sudden change of the energy stream without any assumption of the data structure. In this case, TKEO is applied to amplify the transient or impulse component caused by defects on the drillstring and suppress the background noise, thereby increasing the kurtosis sensitivity. It should be appreciated that the deconvolution using MED and/or TKEO may be applied to any drill bit data acquired from the drill bit sensors 227, including but not limited to accelerations of the drill bit, jerk of the drill bit, weight-on-bit, torque-on-bit, rate of penetration, drill bit revolutions as a function of time (e.g., revolutions per minute), and drill bit temperature. It may also be applied to parameters derived from the above mentioned base parameters such as Mechanical Specific Energy (MSE) or Hydromechanical Specific Energy (HMSE). The deconvolution process may apply any one or a combination of MED or TKEO to deconvolve the drill bit data.

The analysis module 262 is used to decompose the deconvolved drill bit data into intrinsic mode functions (IMFs) using empirical mode decomposition (EMD), and trends in the intrinsic mode functions may be analyzed to identify drill bit failure and/or drill bit wear.

EMD involves leveraging the benefit of the sifting property of a signal. EMD decomposes an arbitrary signal into a finite number of modes or IMFs, regardless of the linear or stationary nature of a signal. The approach basically focuses on analyzing the characteristics of individual IMFs to extract fault-sensitive features.

An IMF is a function that satisfies two conditions: (1) in the entire data set, the number of extrema and the number of zero crossings must either equal or differ at most by one and (2) at any point, the mean value of the envelope defined by the local maxima and the envelope defined by the local minima is zero.

The decomposition is based on these assumptions: (1) the signal has at least two extrema—one maximum and one minimum; (2) the characteristic time scale is defined by the time lapse between the extrema; and (3) if the data are totally devoid of extrema but contain only inflection points, then it can be differentiated once or more times to reveal the extrema. Final results can be obtained by integration(s) of the components.

The process of EMD is as follows. (1) Given a data set, find all local maxima and connect them to develop an upper envelope using a cubic spline. Likewise, find all of the local minima and connect them to develop a lower envelope using a cubic spline. (2) Find the mean of the upper and lower envelope. Denote this mean as $m_1$. The difference between the original signal and the mean becomes the first component $h_1$ as $$x(t) - m_1 = h_1 \quad (5)$$

If $h_1$ satisfies the above IMF conditions, it will be the first IMF; otherwise, new maxima and minima shall again be identified and Steps 1 and 2 will be repeated. This repeated process is known as sifting.

$$h_1 - m_{11} = h_{11} \quad (6)$$

$$h_{1(k-1)} - m_{1k} = h_{1k} \quad (7)$$

or, $$c_1 = h_{1k} \quad (8)$$

The same steps are repeated to determine the second IMF:

$$r_1 = x(t) - c_1 \quad (9)$$

Here, $r_1$ is assumed to be the original signal, and the previous steps are repeated to determine the second IMF, $c_2$. Thus, after $n^{th}$ iteration, the original signal can be decomposed into n number of IMFs, as shown below:

$$r_1 - c_2 = r_2 \quad (10)$$

$$r_{n-1} - c_n = r_n \quad (11)$$

The decomposition process is repeated until the original signal data becomes a monotonic function so that no more IMFs can be deduced.

Figure 4:
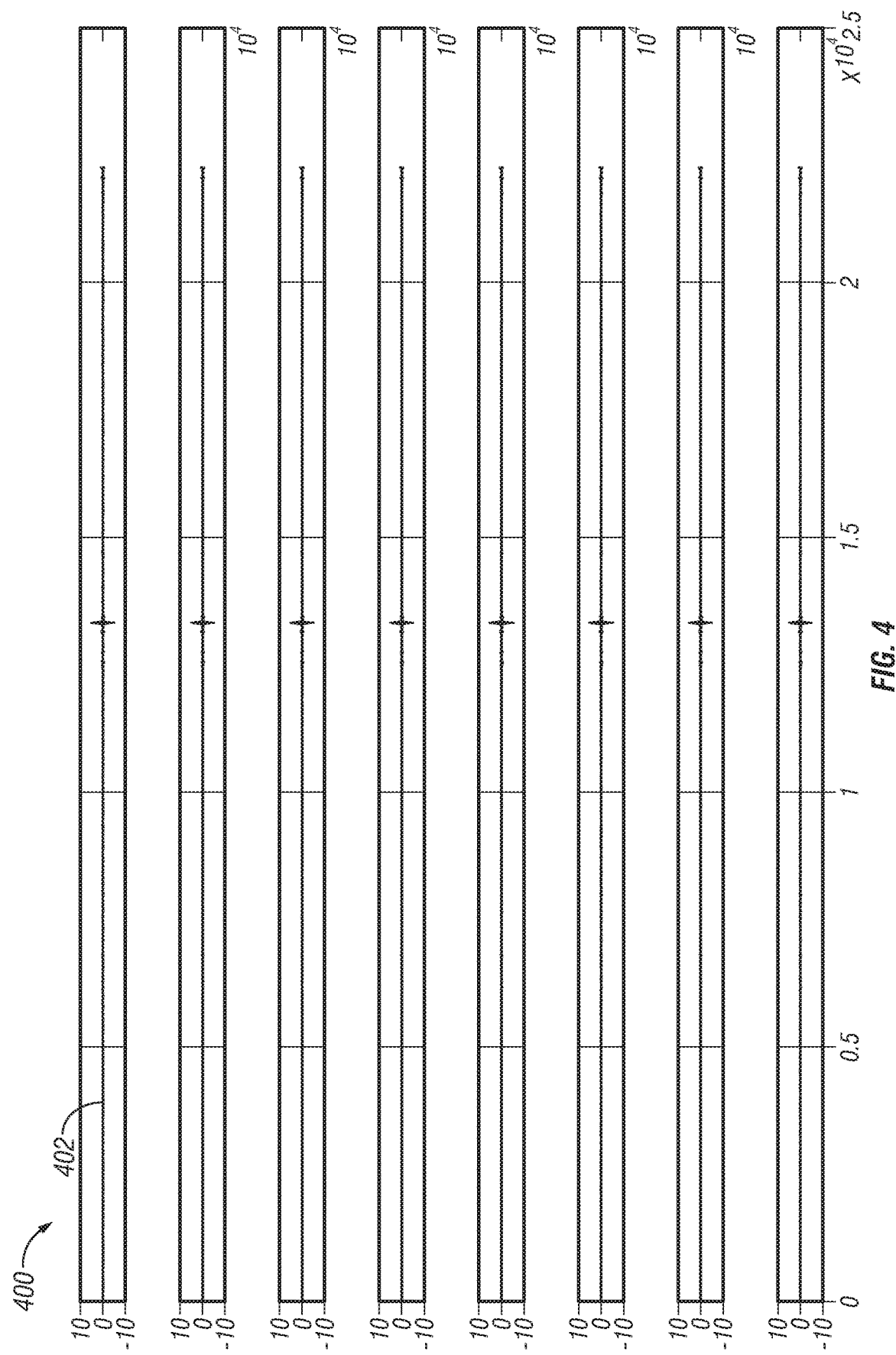
FIGS. 4 and 5 show graph views of the iterative process of generating intrinsic mode functions of drill bit data, according to one or more embodiments.
Figure 4:
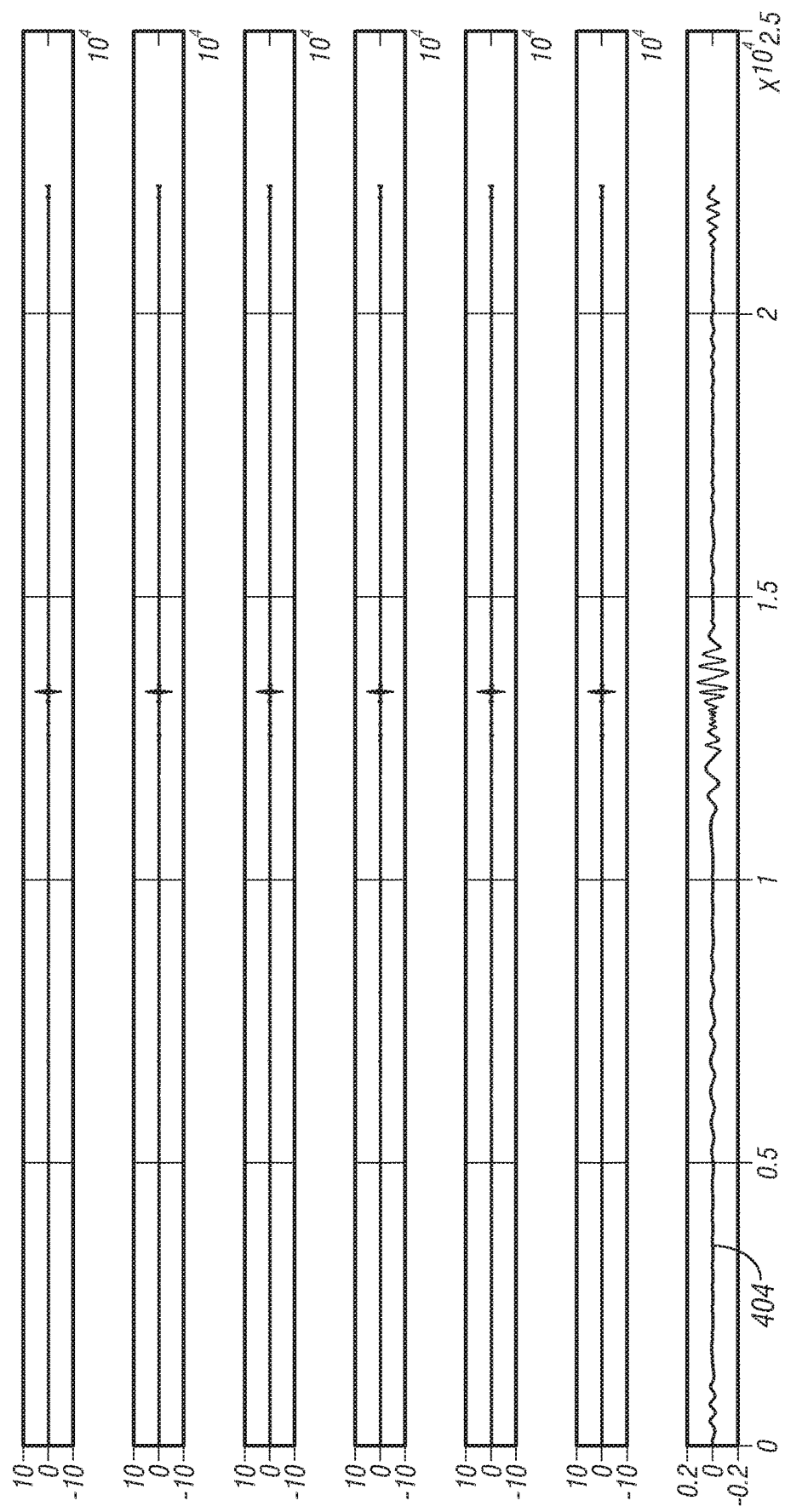
Figure 5:
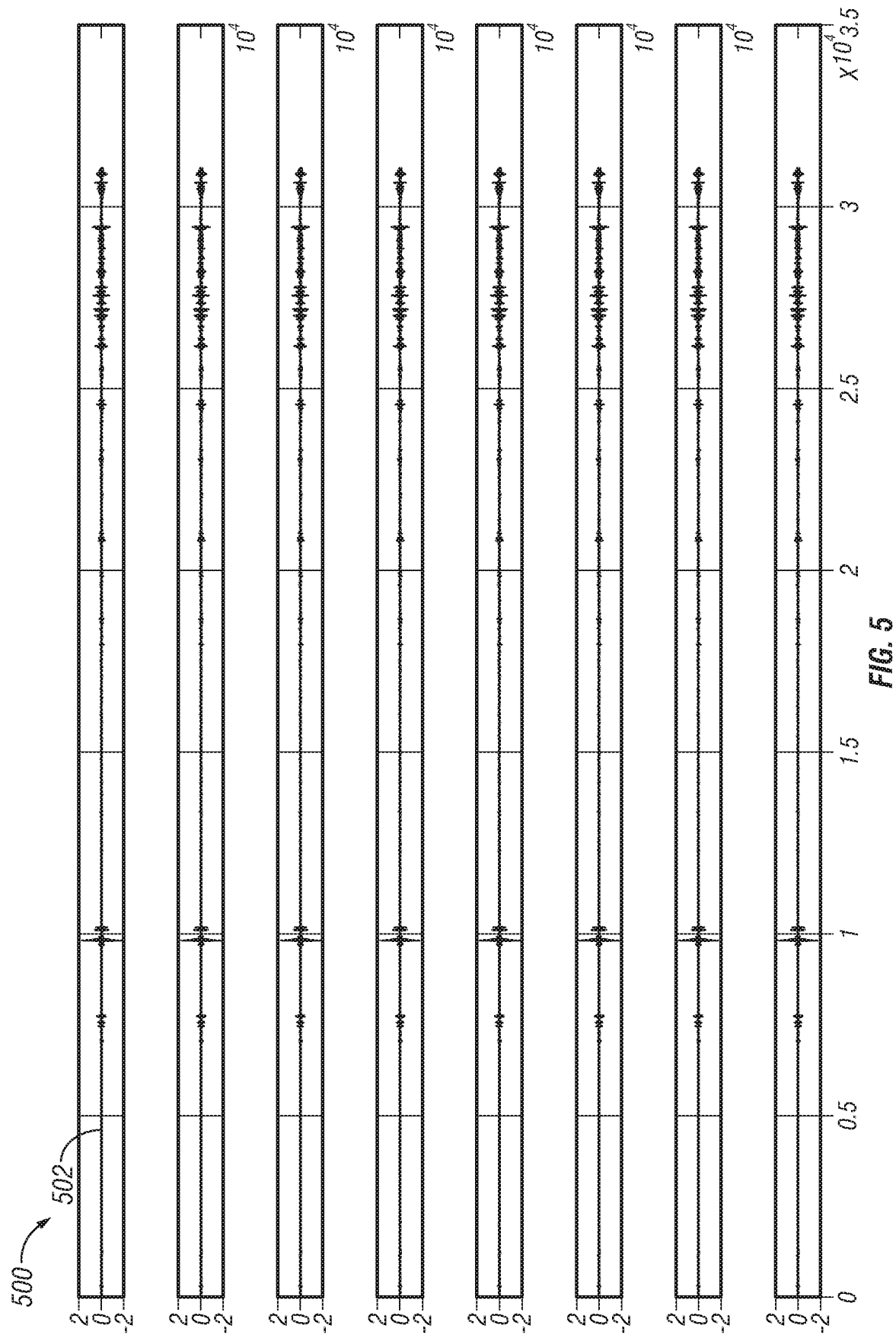
Figure 5:
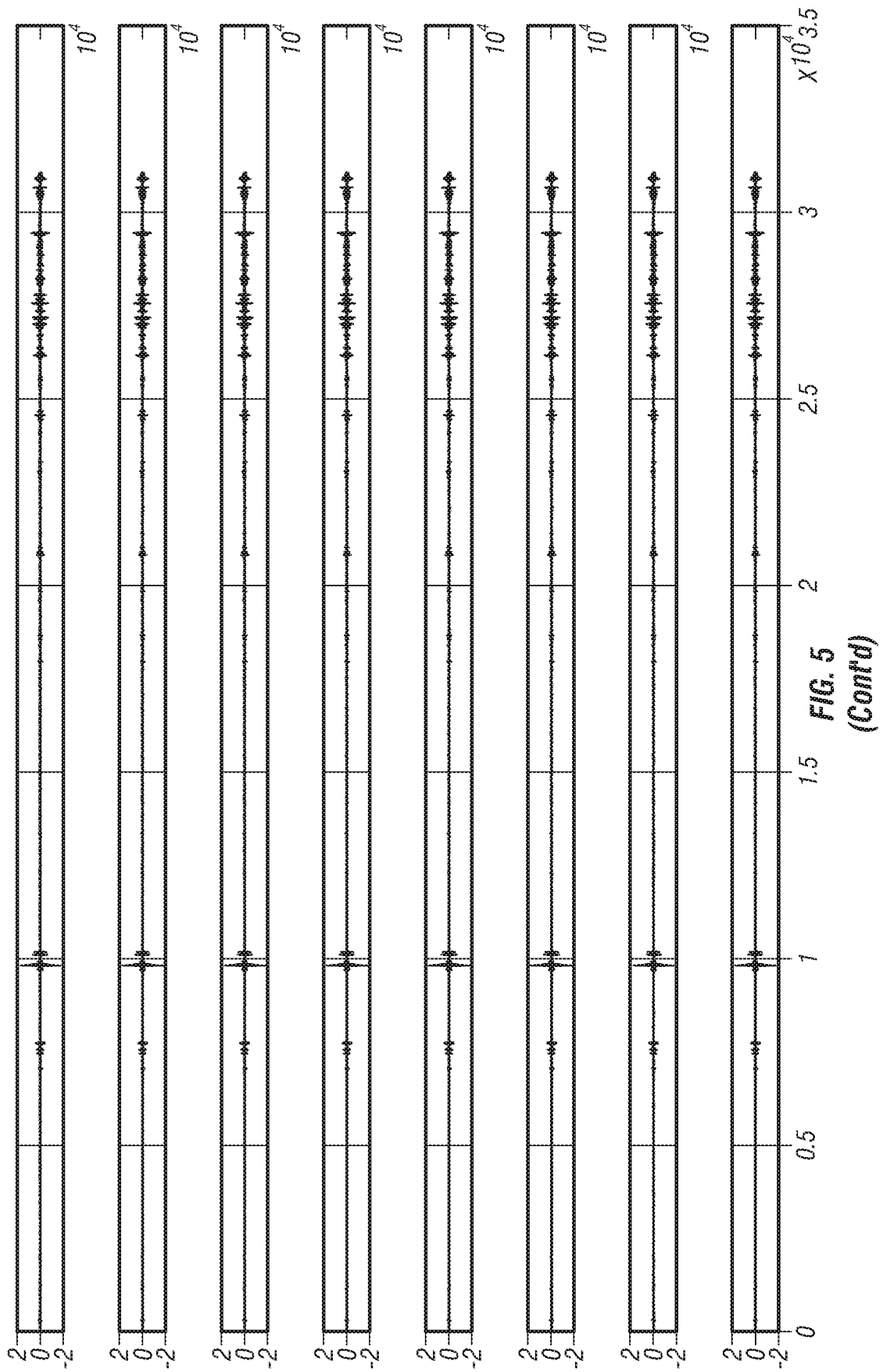
Figure 5:
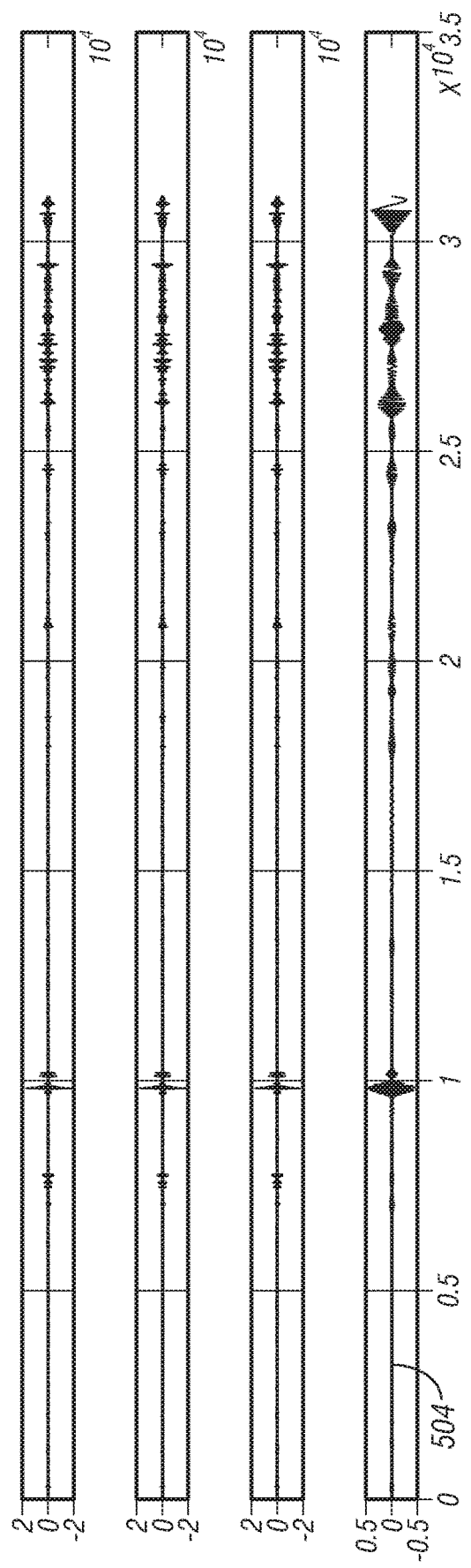

FIGS. 4 and 5 show graph views of the iterative process of generating intrinsic mode functions of the drill bit data, in accordance with one or more embodiments. As shown, the curves 400 and 500 were acquired at a certain depth in a wellbore and represent a parameter associated with the drill bit as a function of time (e.g., jerk as a function of time). FIG. 4 shows the decomposed curves for drill bit data acquired when the drill bit is not undergoing a drill bit failure. FIG. 5 shows the decomposed curves for drill bit data acquired when the drill bit is undergoing a drill bit failure. One or more iterations of decomposition can be carried out with the deconvolved drill bit sensor data to arrive at the IMFs 404 and 504. The top curves 402 and 502 are the deconvolved drill bit data without EMD, and the bottom curves 404 and 504 are the final IMFs generated with EMD. The intermediate curves are the decomposed curves iteratively generated to obtain the final IMFs 404 and 504.

The analysis module 262 is operable to calculate the energy of each IMF, which can be used to evaluate whether the drill bit is experiencing a drill bit failure. The total energy of each IMF of the drill bit data may be calculated as:

$$E_i = \int_{-\infty}^{+\infty} |c_i(t)|^2 dt \quad (12)$$

A feature vector (T) as a function of depth based on the total energies calculated may be constructed as $$T = [E_1, E_2, E_3, E_4, \ldots, E_N] \quad (13)$$

The feature vector (T) may be normalized to obtain:

$$T_{normalized} = \frac{T}{norm(T)} \quad (14)$$

Figure 6:
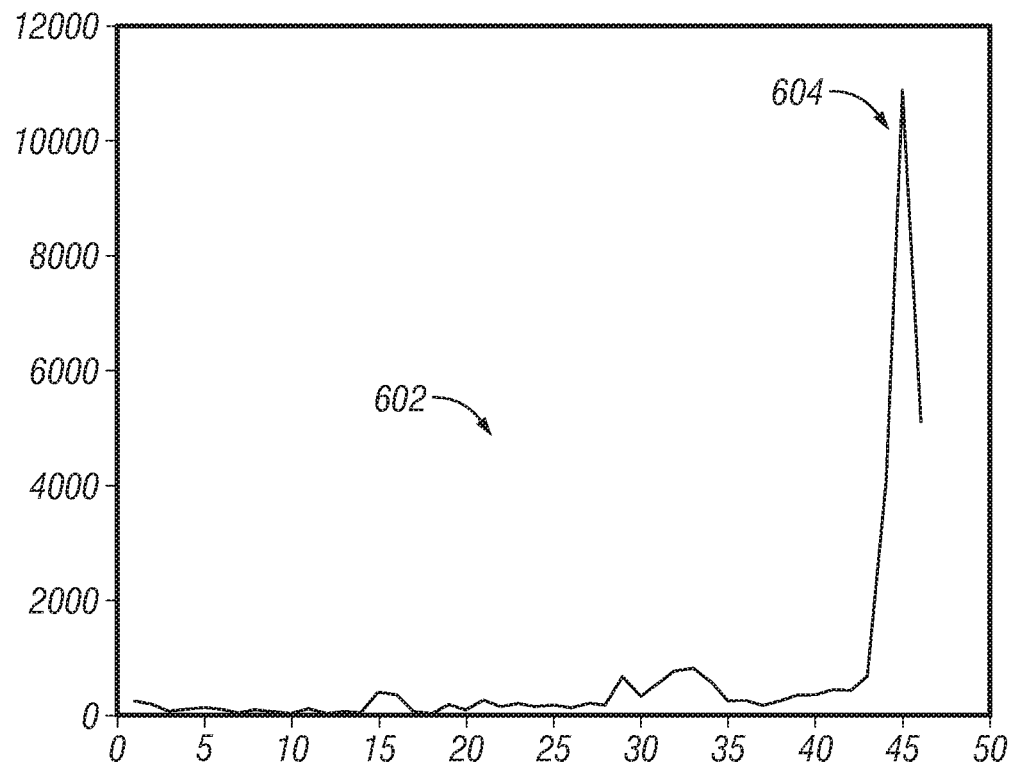
FIGS. 6 and 7 show graph views of normalized energy curves calculated for intrinsic mode functions, according to one or more embodiments.
Figure 7:
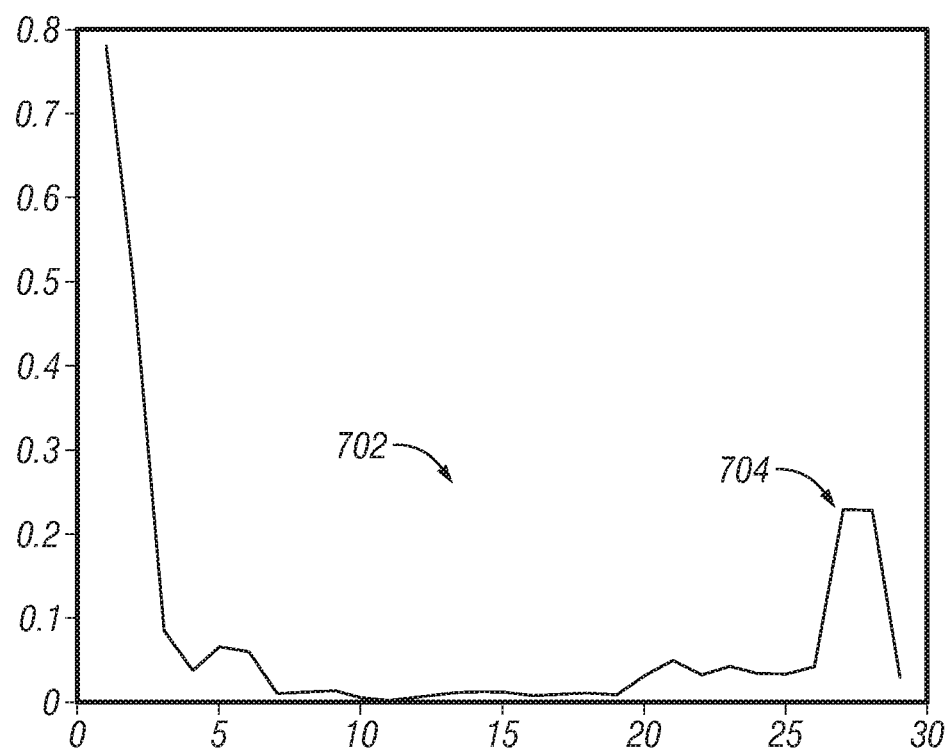

The analysis module 262 may analyze the normalized energy vector to identify a drill bit failure. For example, FIGS. 6 and 7 show graph views of the normalized energy curves 602 and 702, in accordance with one or more embodiments. As shown, the energy curves 602 and 702 are the energy of a drill bit parameter as functions of depth or time and experience spikes in energy 604, 704. The energy spike 604 is attributable to when the drill bit is undergoing a drill bit failure, whereas the energy spike 704 is attributable to when the drill bit is undergoing no drill bit failure, but exhibits increased energy due in part to formation conditions.

The normalized energy vector may be compared against measured formation data, a formation model, and/or a fractional bit wear model based on formation parameters to identify a drill bit failure and/or drill bit wear. For example, a formation model may be generated based on the formation data acquired using the downhole sensor 228 including but not limited to any one or combination of a seismic measurement device, a resistivity measurement device, and a gamma ray logging tool. Characteristics of the earth formation may be compared with the energy curve as a function of depth to identify whether drilling performance is attributable to the formation properties or drill bit failure. For example, suppose the formation model indicates that the formation characteristics have not changed when the energy curve exhibits the energy spike 604, this may indicate that the energy spike 604 is caused by a drill bit failure and not the drill bit-formation interaction. Also, suppose the formation model indicates that the formation characteristics have changed when the energy curve exhibits the energy spike 704, this may indicate that the energy spike 704 is caused by the drill bit-formation interaction and not drill bit failure.

As a non-limiting example of a drill bit wear model of a polycrystalline diamond compact (PDC) drill bit, the fractional bit wear factor $y_i$ at measured depth $X_i$ is given by:

$$y_i = \sqrt[3]{\frac{\pi}{3.2} \frac{\beta}{V_0} \frac{D_b^2}{G} \frac{a_{0i} S_i^2 X_i}{(1 - y_{i-1})} + y_{i-1}^3} \quad (15)$$

where β is abrasive constant (dimensionless), $V_0$ is is the volume of truncated cylinder with the flat surface through bottom circle center in a PDC cutter, G is a model constant, $D_b$ is the bit diameter in inches, $a_{0i}$ is a model constant, and $S_i$ is the confined compressive rock strength. Although this discussion provides a drill bit wear model for a PDC drill bit, it should be appreciated that any other suitable drill bit wear model may be applied to estimate the drill bit wear as a function of depth for comparison with the deconvolved-decomposed energy data. With the fractional bit wear factor ($y_i$), the bit wear function of a PDC bit is given by:

$$W_f = 1 - \frac{\Delta h}{h} = 1 - y_i \quad (16)$$

where h is maximum height of the drill bit teeth, and Δh is the change in height of drill bit teeth due to drill bit wear. The International Association of Drilling Contractors (IADC) bit dull grade may also be calculated as:

$$\Delta BG = 8 \cdot \frac{\Delta h}{h} = 8 \cdot y_i \quad (17)$$

Figure 8:
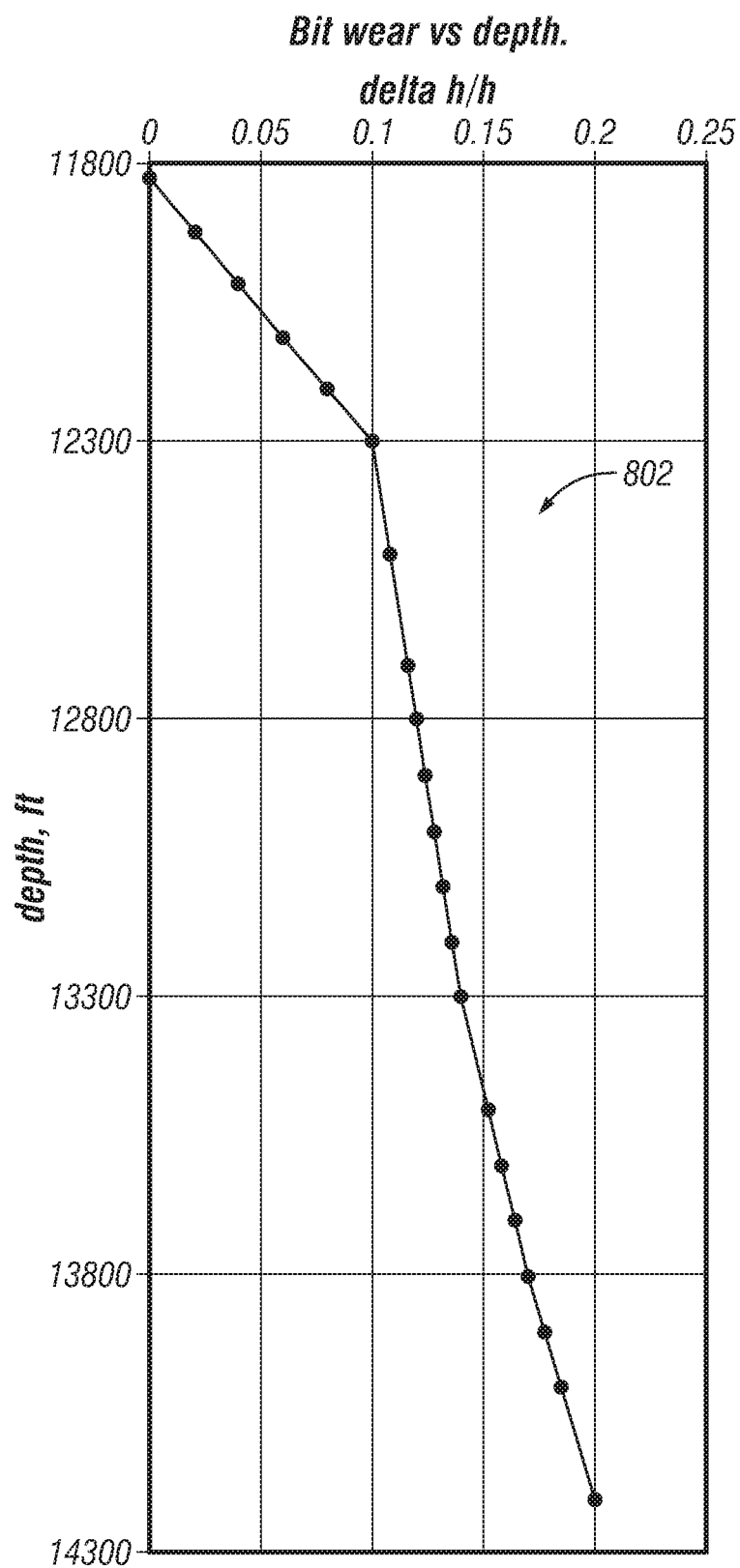
FIG. 8 shows a graph view of a drill bit wear curve ($\Delta h/h$) as a function of depth, in accordance with one or more embodiments.

FIG. 8 shows a graph view of a drill bit wear curve (Δh/h) 802 as a function of depth (feet), in accordance with one or more embodiments. As shown, the drill bit wear 802 of the drill bit increases as the drill bit penetrates farther into the earth formation. It should be appreciated that the analysis module 262 is operable to analyze the energy curves of the drill bit data (e.g., curve 602 of FIG. 6) with the drill bit wear curve 802 to identify a drill bit failure.

Figure 9:
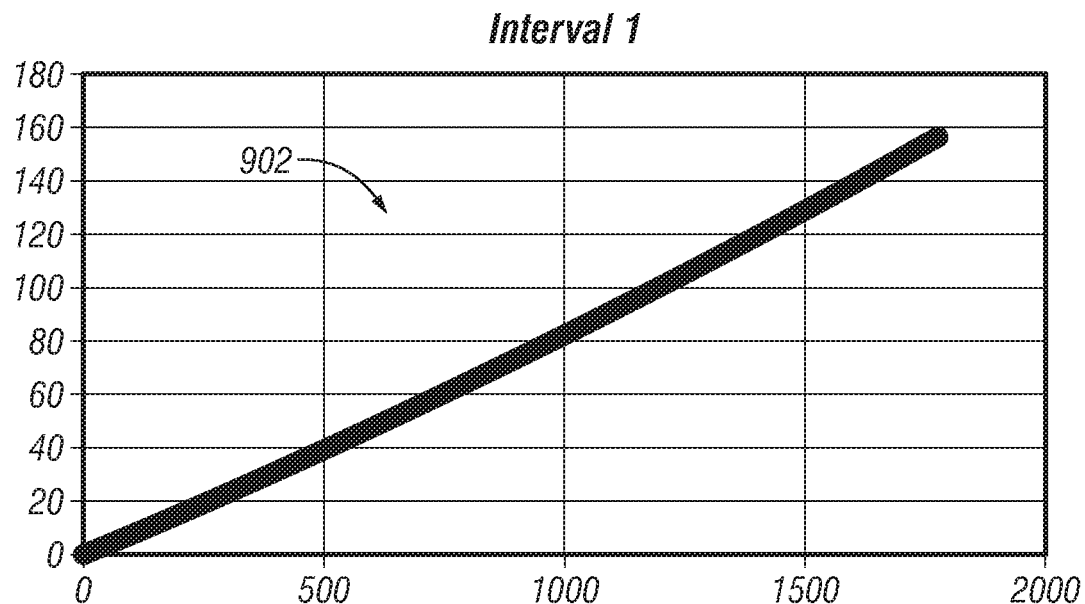
Figure 10:
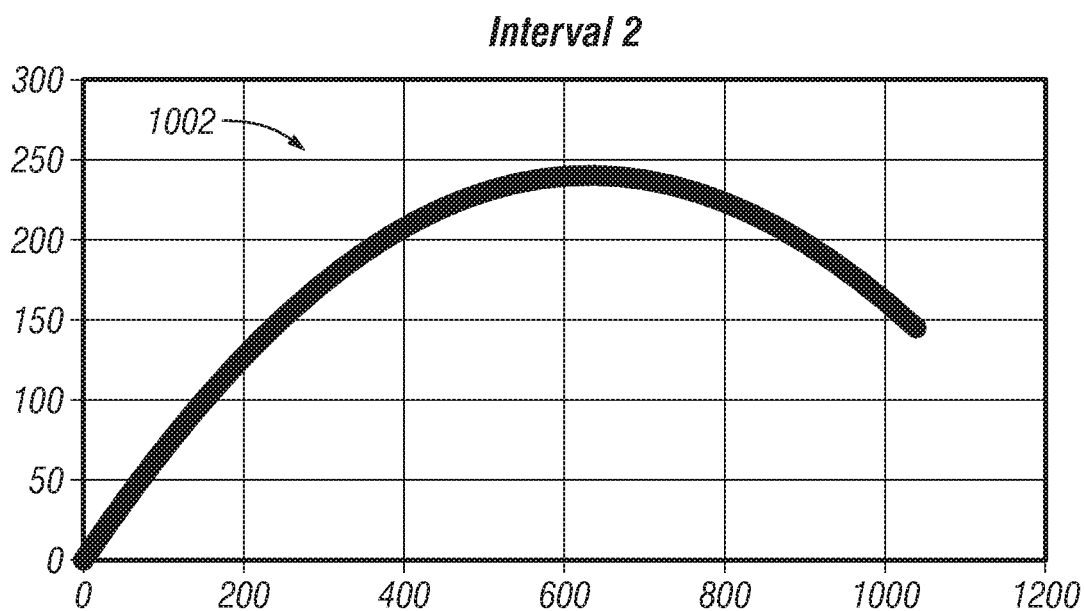

The analysis module 262 may also be operable to identify changes in polarity of the energy curves, which may indicate a drill bit failure. FIGS. 9-11 show graph views of the energy curves 902, 1002, and 1102 for rate of penetration data measured along three different depth intervals corresponding to the drill bit wear curve 802, in accordance with one or more embodiments. FIG. 9 shows the energy curve 902 as a function of depth generated from the rate of penetration data collected along the first depth interval from about 11800 feet to about 12300 feet corresponding to the drill bit wear curve 802 of FIG. 8. As shown in FIG. 10, the energy curve 1002 is a function of depth for the second depth interval from about 12300 feet to about 12800 feet corresponding to the drill bit wear curve 802. FIG. 11 shows the energy curve 1102 as a function of depth for the third depth interval from about 12800 feet to about 13300 feet corresponding to the drill bit wear curve 802. As shown, the energy curve 1102 flips in polarity relative to the previous energy curves 902 and 1002. The depth where the energy curve flips in polarity may indicate a drill bit failure or inefficient drilling due to drill bit-formation interaction, such as severe vibration due to non-uniform drill bit wear and formation interaction. It should be appreciated that identifying drill bit failure allows the drilling operator to take proper mitigation actions in a timely manner, including but not limited to determining whether or when to remove the drill bit; replacing the drill bit; or changing the weight-on-bit, torque-on-bit, or rate of revolutions of the drill bit.

As previously noted, the drill bit sensor data can be used to train drilling models to predict drill bit failure. As a non-limiting example, the energy curves may be calculated for about five cases where the drill bit is not undergoing a drill bit failure and five cases where the drill bit is undergoing a drill bit failure. The energy curves may be used to train drilling operation models including but not limited to neural networks, fuzzy rule-based systems, support vector machines, etc. It should be noted that any number of cases may be used to train the drilling operation model. Based on this trained data, the drilling operation model can predict the drill bit life, drill bit wear, or drill bit failure along a planned or projected drilling profile. Drilling the wellbore using a drill bit may continue until the predicted drill bit failure occurs.

As previously discussed, the drilling system 100 of FIG. 1 may also include sensors 129 distributed along the drill string 108 to measure various parameters for identifying or predicting drill bit failure. The sensors 129 may include any one or a combination of tri-axial accelerometers, strain gauges, load cells, temperature sensors, or pressure sensors. The distributed sensor data can be deconvolved and decomposed as described herein with respect to the drill bit sensor data. The decomposed distributed sensor data can be compared against and cross correlated with the drill bit sensor data and/or formation data to identify a drill bit failure.

It should be appreciated that that the systems and methods described herein provide a solution necessarily rooted in downhole drilling tools in order to overcome a problem specifically arising from drilling a wellbore using a drill bit. The problem specifically arising from drilling a wellbore includes the difficulty in indentifying whether a drill bit failure has occurred in the wellbore. The method and system described herein identifies or predicts the drill bit failure by deconvoluting sensor data indicative of a parameter associated with the drill bit including any one or a combination of acceleration of the drill bit, jerk of the drill bit, weight-on-bit, torque-on-bit, rate of penetration, drill bit revolutions as a function of time, and drill bit temperature. Once a drill bit failure is identified or predicted, a drilling operator can determine whether or when to remove the drill bit from the wellbore.

In addition to the embodiments described above, many examples of specific combinations are within the scope of the disclosure, some of which are detailed below:

Example 1: A method of drilling a wellbore through a subterranean earth formation, comprising:
 drilling the wellbore using a drill bit;
  measuring data indicative of a parameter associated with the drill bit using a sensor located in the wellbore;
  decomposing the data to generate an intrinsic mode function of the drill bit data; and
  analyzing the intrinsic mode function to identify a drill bit failure.

Example 2: The method of example 1, wherein analyzing comprises calculating the energy of the intrinsic mode function of the drill bit data to use the energy of the intrinsic mode function as an indication of the drill bit failure.

Example 3: The method of example 2, wherein analyzing comprises comparing the energy of the intrinsic mode function to a drill bit wear model.

Example 4: The method of example 1, wherein the parameter associated with the drill bit comprises any one or a combination of acceleration of the drill bit, jerk of the drill bit, weight-on-bit, torque-on-bit, rate of penetration, drill bit revolutions as a function of time, and drill bit temperature.

Example 5: The method of example 1, wherein decomposing comprises applying any one or a combination of a minimum entropy deconvolution and a Teager-Kaiser energy operator to deconvolve the measured data and decomposing the deconvolved data to generate the intrinsic mode function.

Example 6: The method of example 1, further comprising measuring formation data indicative of the earth formation using any one or combination of a seismic measurement device, a resistivity measurement device, and a gamma ray logging tool.

Example 7: The method of example 6, wherein analyzing comprises comparing the intrinsic mode function to a model of the earth formation based on the measured formation data.

Example 8: The method of example 2, wherein analyzing comprises identifying a change in polarity of the energy of the intrinsic mode function relative to another intrinsic mode function for a separate location in the wellbore.

Example 9: The method of example 1, further comprising:
 decomposing the measured data to generate two or more intrinsic mode functions of the drill bit data;
 calculating the energy of the intrinsic mode functions;
 generating a normalized set of energies for the intrinsic mode functions; and
 identifying an energy spike in the normalized set of energies to identify the drill bit failure.

Example 10: The method of example 1, further comprising identifying whether or when to remove the drill bit from the wellbore based on the identified drill bit failure.

Example 11: The method of example 1, further comprising using the drill bit to extend the wellbore.

Example 12: A system for drilling a wellbore through a subterranean earth formation, comprising:
 a drill bit;
 a sensor located in the wellbore intersecting the earth formation and operable to measure data indicative of a parameter associated with the drill bit; and
 a processor in communication with the sensor and operable to:
  decompose the data to generate an intrinsic mode function of the drill bit data; and
  analyze the intrinsic mode function to identify a drill bit failure.

Example 13: The system of example 11, wherein the processor is operable to calculate the energy of the intrinsic mode function of the drill bit data to use the energy of the intrinsic mode function as an indication of the drill bit failure.

Example 14: The system of example 12, wherein the processor is operable to compare the energy of the intrinsic mode function to a bit wear model to identify the drill bit failure.

Example 15: The system of example 11, wherein the parameter associated with the drill bit comprises any one or a combination of acceleration of the drill bit, jerk of the drill bit, weight-on-bit, torque-on-bit, rate of penetration, drill bit revolutions as a function of time, and drill bit temperature.

Example 16: The system of example 11, further comprising a downhole sensor including any one or combination of a seismic measurement device, a resistivity measurement device, or a gamma ray logging tool.

Example 17: The system of example 16, wherein the processor is operable to compare the intrinsic mode function to a model of the earth formation based on formation data measured using the formation measurement device.

Example 18: The system of example 11, wherein the processor is operable to identify a change in polarity of the energy of the intrinsic mode function relative to another intrinsic mode function for a separate location in the wellbore.

Example 19: A method of drilling a wellbore through a subterranean earth formation, drilling the wellbore using a drill bit;
 measuring data indicative of a parameter associated with the drill bit using a sensor located in the wellbore;
 decomposing the measured data to generate an intrinsic mode function of the data; analyzing the intrinsic mode function to predict a drill bit failure; and continuing to drill the wellbore using the drill bit until the predicted drill bit failure occurs.

Example 20: The method of example 19, wherein analyzing comprises training a drilling model to predict the drill bit failure using the intrinsic mode function.

Example 21: The method of example 19, wherein the parameter associated with the drill bit comprises any one or a combination of acceleration of the drill bit, jerk of the drill bit, weight-on-bit, torque-on-bit, rate of penetration, drill bit revolutions as a function of time, and drill bit temperature.

One or more specific embodiments of the present disclosure have been described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

In the following discussion and in the claims, the articles "a," "an," and "the" are intended to mean that there are one or more of the elements. The terms "including," "comprising," and "having" and variations thereof are used in an open-ended fashion, and thus should be interpreted to mean "including, but not limited to . . . ." Also, any use of any form of the terms "connect," "engage," "couple," "attach," "mate," "mount," or any other term describing an interaction between elements is intended to mean either an indirect or a direct interaction between the elements described. In addition, as used herein, the terms "axial" and "axially" generally mean along or parallel to a central axis (e.g., central axis of a body or a port), while the terms "radial" and "radially" generally mean perpendicular to the central axis. The use of "top," "bottom," "above," "below," "upper," "lower," "up," "down," "vertical," "horizontal," and variations of these terms is made for convenience, but does not require any particular orientation of the components.

Certain terms are used throughout the description and claims to refer to particular features or components. As one skilled in the art will appreciate, different persons may refer to the same feature or component by different names. This document does not intend to distinguish between components or features that differ in name but not function.

Reference throughout this specification to "one embodiment," "an embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A method of drilling a wellbore through a subterranean earth formation, comprising:
   drilling the wellbore using a drill bit;
   measuring data indicative of a parameter associated with the drill bit using a sensor located in the wellbore;
   decomposing, by a processor in communication with the sensor, the data to generate an intrinsic mode function of the drill bit data using empirical mode decomposition;
   analyzing, by the processor, the intrinsic mode function to identify a drill bit failure to a drilling operator, wherein analyzing comprises:
      calculating the energy of the intrinsic mode function of the drill bit data; and
      comparing the energy of the intrinsic mode function to a drill bit wear model; and
   deciding, by the drilling operator based on the identified drill bit failure, at least one of whether or when to remove the drill bit from the wellbore; to replace the drill bit; or to change a weight-on-bit, a torque-on-bit, or a rate of revolutions of the drill bit.

2. The method of claim 1, wherein the parameter associated with the drill bit comprises any one or a combination of acceleration of the drill bit, jerk of the drill bit, weight-on-bit, torque-on-bit, rate of penetration, drill bit revolutions as a function of time, and drill bit temperature.

3. The method of claim 1, wherein decomposing comprises applying any one or a combination of a minimum entropy deconvolution and a Teager-Kaiser energy operator to deconvolve the measured data and decomposing the deconvolved data to generate the intrinsic mode function.

4. The method of claim 1, further comprising measuring formation data indicative of the earth formation using any one or combination of a seismic measurement device, a resistivity measurement device, and a gamma ray logging tool.

5. The method of claim 4, wherein analyzing comprises comparing the intrinsic mode function to a model of the earth formation based on the measured formation data.

6. The method of claim 1, wherein analyzing comprises identifying a change in polarity of the energy of the intrinsic mode function relative to another intrinsic mode function for a separate location in the wellbore.

7. The method of claim 1, further comprising:
   decomposing the measured data to generate two or more intrinsic mode functions of the drill bit data;
   calculating the energy of the intrinsic mode functions;
   generating a normalized set of energies for the intrinsic mode functions; and
   identifying an energy spike in the normalized set of energies to identify the drill bit failure.

8. The method of claim 1, further comprising using the drill bit to extend the wellbore.

9. A system for drilling a wellbore through a subterranean earth formation, the system being run by a drilling operator, comprising:
   a drill bit;
   a sensor located in the wellbore intersecting the earth formation and operable to measure data indicative of a parameter associated with the drill bit; and
   a processor in communication with the sensor and operable to:

decompose the data to generate an intrinsic mode function of the drill bit data using empirical mode decomposition;

analyze the intrinsic mode function to identify a drill bit failure to the drilling operator, wherein analyzing comprises:

calculating the energy of the intrinsic mode function of the drill bit data; and comparing the energy of the intrinsic mode function to a drill bit wear model; and wherein the identification of the drill bit failure allows the drilling operator to at least one of determine whether or when to remove the drill bit from the wellbore; replace the drill bit; or change a weight-on-bit, a torque-on-bit, or a rate of revolutions of the drill bit.

10. The system of claim 9, wherein the parameter associated with the drill bit comprises any one or a combination of acceleration of the drill bit, jerk of the drill bit, weight-on-bit, torque-on-bit, rate of penetration, drill bit revolutions as a function of time, and drill bit temperature.

11. The system of claim 9, further comprising a downhole sensor including any one or combination of a seismic measurement device, a resistivity measurement device, or a gamma ray logging tool.

12. The system of claim 11, wherein the processor is operable to compare the intrinsic mode function to a model of the earth formation based on formation data measured using a formation measurement device.

13. The system of claim 9, wherein the processor is operable to identify—a change in polarity of the energy of the intrinsic mode function relative to another intrinsic mode function for a separate location in the wellbore.

14. A method of drilling a wellbore through a subterranean earth formation, comprising:

drilling the wellbore using a drill bit;

measuring data indicative of a parameter associated with the drill bit using a sensor located in the wellbore;

decomposing, by a processor in communication with the sensor, the measured data to generate an intrinsic mode function of the data using empirical mode decomposition;

analyzing, by the processor, the intrinsic mode function to predict a drill bit failure;

continuing to drill the wellbore using the drill bit until the predicted drill bit failure occurs, wherein analyzing comprises:

calculating the energy of the intrinsic mode function of the drill bit data; and comparing the energy of the intrinsic mode function to a drill bit wear model, and replacing the drill bit.

15. The method of claim 14, wherein analyzing comprises training a drilling model to predict the drill bit failure using the intrinsic mode function.

16. The method of claim 14, wherein the parameter associated with the drill bit comprises any one or a combination of acceleration of the drill bit, jerk of the drill bit, weight-on-bit, torque-on-bit, rate of penetration, drill bit revolutions as a function of time, and drill bit temperature.

* * * * *